(12) United States Patent
Lucas et al.

(10) Patent No.: US 7,977,814 B2
(45) Date of Patent: Jul. 12, 2011

(54) CENTRALIZED HV INTERLOCK SYSTEM

(75) Inventors: Marc Lucas, Oakland, MI (US); Bo Wu, Northville, MI (US); Venkateswa Anand Sankaran, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 12/360,092

(22) Filed: Jan. 26, 2009

(65) Prior Publication Data

US 2010/0187904 A1    Jul. 29, 2010

(51) Int. Cl.
*H01H 9/20* (2006.01)
*B60L 3/00* (2006.01)

(52) U.S. Cl. .................... 307/10.1; 200/50.01

(58) Field of Classification Search .............. 307/9.1, 307/10.1, 10.7; 439/923, 291; 361/88, 23, 361/615; 200/50.01
See application file for complete search history.

(56) References Cited

U.S. PATENT DOCUMENTS

| | | | |
|---|---|---|---|
| 5,336,934 A * | 8/1994 | Toepfer et al. | 307/10.1 |
| 5,504,655 A | 4/1996 | Underwood et al. | |
| 5,942,737 A | 8/1999 | Waters et al. | |
| 7,084,361 B1 * | 8/2006 | Bowes et al. | 200/16 R |
| 7,310,242 B2 | 12/2007 | Ramos et al. | |
| 7,508,097 B2 * | 3/2009 | Furuta et al. | 307/328 |
| 7,586,722 B2 * | 9/2009 | Scholer et al. | 361/88 |

* cited by examiner

*Primary Examiner* — Albert W Paladini
(74) *Attorney, Agent, or Firm* — David Kelly, Esq.; Tung & Associates

(57) ABSTRACT

A centralized high voltage interlock system includes an electrical source, an interlock control unit electrically connected to the electrical source, at least one high voltage component disposed in direct electrical contact with the interlock control unit and a high voltage electrical interlock disposed in electrical contact with the at least one high voltage component.

19 Claims, 2 Drawing Sheets

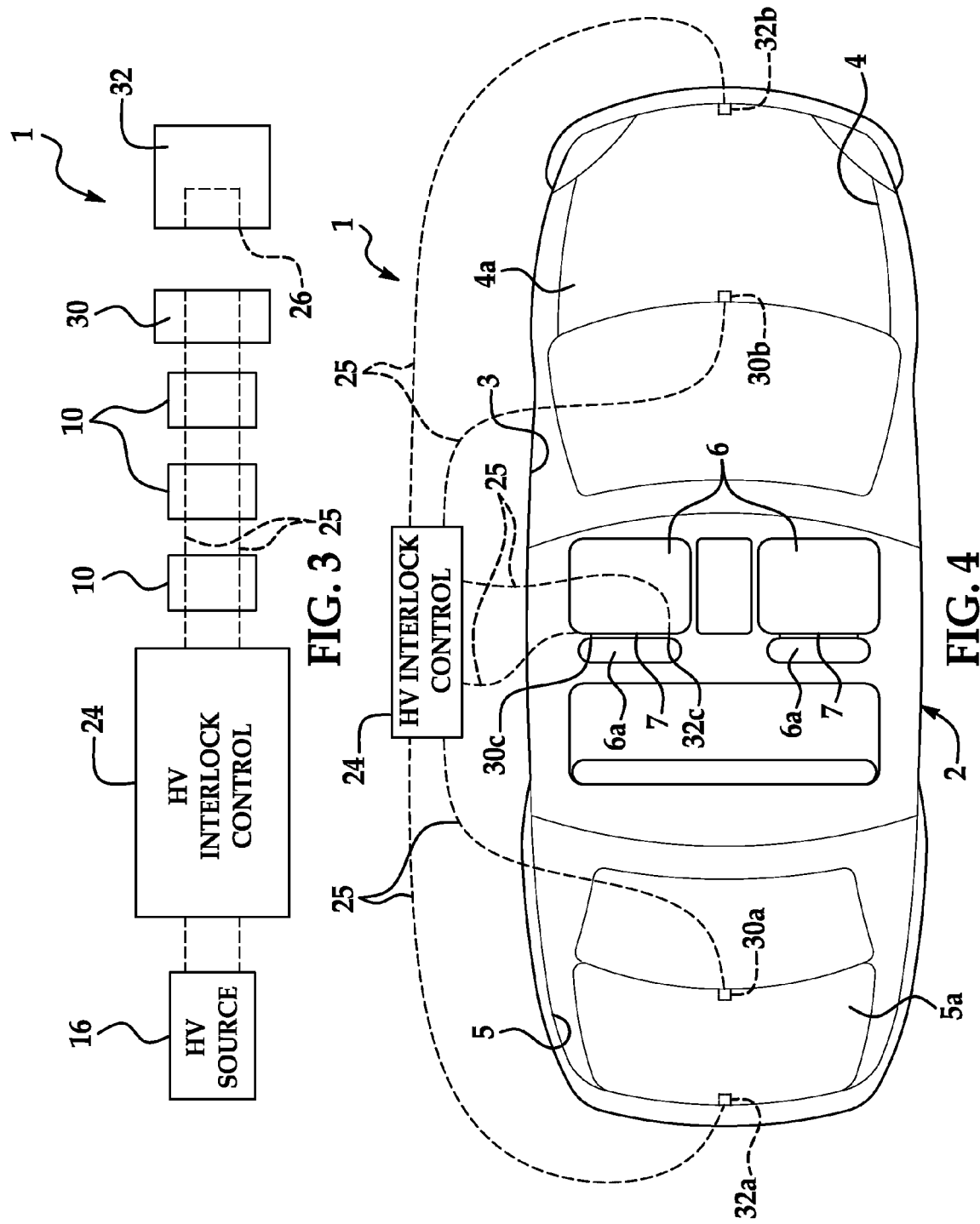

CENTRALIZED HV INTERLOCK SYSTEM

FIELD

The present disclosure relates generally to high-voltage interlock (HVIL) systems. More particularly, the disclosure relates to a centralized HVIL system which is characterized by simplicity in design.

BACKGROUND

In systems in which electrical current is transmitted through circuits, such as electric and hybrid electric vehicles, for example, provision is often made to protect service personnel and the like from high voltages which may be used in such systems. High-voltage power systems may utilize energy storage devices which require a certain amount of time to discharge electrical power prior to access of a component in the system. Physical barriers such as protective covers and lock-out devices, for example, may be used to prevent premature physical contact of service or other personnel with the components in a high-voltage power system.

A high-voltage interlock (HVIL) system utilizes an HV interlock control device to open an electrical circuit and prevent flow of high voltage (HV) current through the system before access to a component in the system is permitted. Current implementation of high voltage interlocks utilizes a hard wired circuit that runs through interlock switches at all access points for the HV components and connectors in the system. The high voltage current can be present in the system until any of the HV components is individually accessed such as by the removal of an access cover or connector, for example, which opens the interlock switch for the HV component and breaks the circuit of the HV interlock system.

In implementation of the current HVIL system, the HV circuit is hard-wired through an interlock switch at the access point for each HV component in the system. Direct access of each HV component results in termination and discharge of electrical current through all HV components in the system. This arrangement, however, increases the complexity and cost of the system. Therefore, a centralized HVIL system which is characterized by simplicity in design is needed.

SUMMARY

The present disclosure is generally directed to a centralized high voltage interlock system. An illustrative embodiment of the centralized high voltage interlock system includes an electrical source, an interlock control unit electrically connected to the electrical source, at least one high voltage component disposed in direct electrical contact with the interlock control unit and a high voltage electrical interlock disposed in electrical contact with the at least one high voltage component.

BRIEF DESCRIPTION OF THE DRAWINGS

The disclosure will now be made, by way of example, with reference to the accompanying drawings, in which:

FIG. 3 is a schematic diagram of an illustrative embodiment of the centralized HV interlock system, shown in a disconnected and inactivated configuration.

FIG. 4 is a top view of a vehicle, more particularly illustrating implementation of the centralized HV interlock system using various structural components of the vehicle.

DETAILED DESCRIPTION

Figure 1:
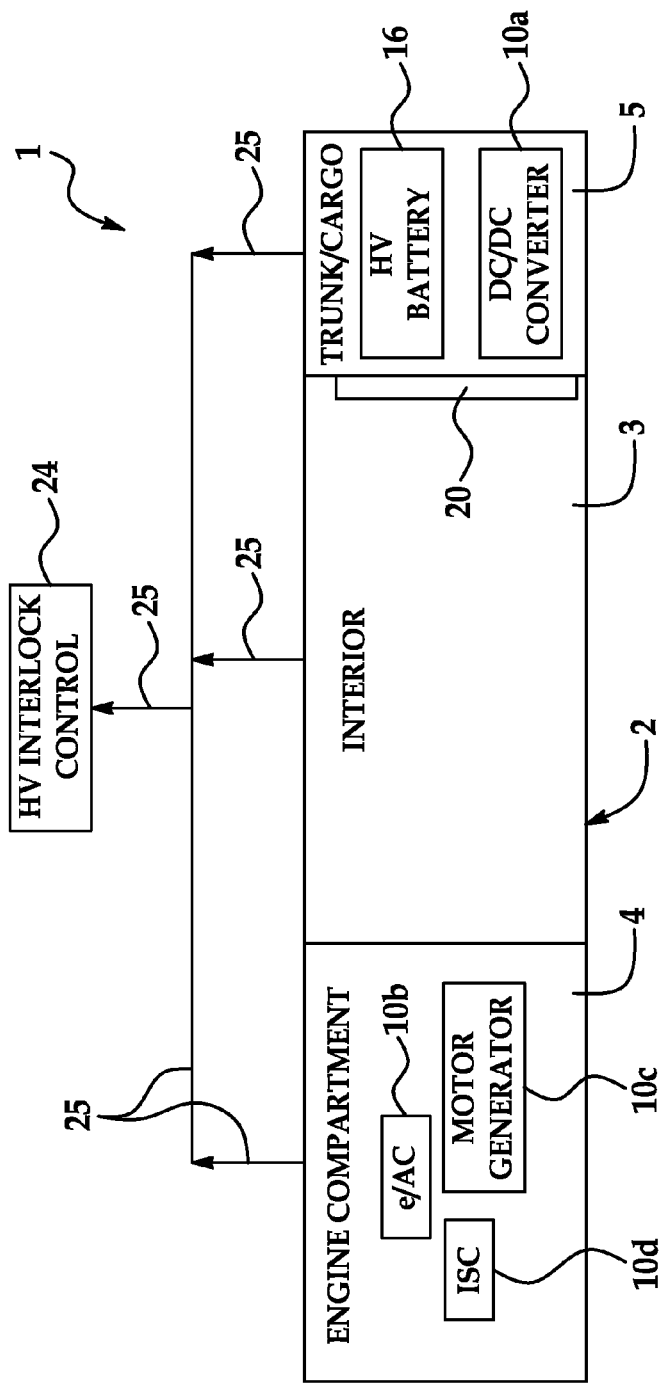
FIG. 1 is a schematic diagram of an illustrative embodiment of the centralized HV interlock system, applied to a vehicle.

Referring to the drawings, an illustrative embodiment of the centralized HV interlock system, hereinafter system, is generally indicated by reference numeral 1. The system 1 may be adapted for any type of application which utilizes a medium-voltage (about 15~150V) or high-voltage (above about 150V) power system. As shown in FIG. 1, in some applications the system 1 may be adapted for implementation in a vehicle 2 which includes a high-voltage power system. The vehicle 2 may be an electric vehicle, fuel cell vehicle, hybrid electric vehicle or internal combustion engine vehicle, for example and without limitation. Generally, the vehicle 2 may include a vehicle interior 3 which includes a passenger cabin (not shown); an engine compartment 4; and a trunk/cargo compartment 5.

A high voltage (HV) electrical source 16, such as an HV battery, for example, is provided in the vehicle 2 such as in the trunk/cargo compartment 5 thereof, for example. The HV electrical source 16 may be a high voltage traction battery, a high voltage capacitor, a high voltage inductor or other energy storage device. Various high-voltage (HV) components, generally indicated by reference numeral 10 in FIGS. 2 and 3 of the drawings, are electrically connected in series to the HV electrical source 16 such as via suitable electrical wiring 25. The HV electrical source 16 provides electrical current of sufficient voltage to power each of the HV components 10. As shown in FIG. 1, the HV components 10 may include, for example, a high voltage DC/DC converter 10a which may be provided in the trunk/cargo compartment 5, for example, of the vehicle 2 to convert DC output current from the HV electrical source 16 into low voltage DC current. In some applications, an access cover 20 may be provided on an interior surface of the vehicle interior 3 to facilitate access to the trunk/cargo compartment 5 upon removal. As further illustrated in FIG. 1, the HV components 10 may also include a high voltage vehicle air conditioning unit 10b for the vehicle 2; a high voltage electrical motor and/or generator 10c; a high voltage inverter system controller (ISC) module 10d having at least one inverter, a high voltage PTC heater and/or other high voltage climate control devices, for example and without limitation, which may be provided in the engine compartment 4 or any other suitable location in the vehicle 2. The HV components 10 may be components of transmissions which are independent of high voltage traction motors including but not limited to crank ISG, belt ISG, electric rear axle drive, etc., having one or more high voltage motors and located at both or either the front or rear of a vehicle.

Figure 2:
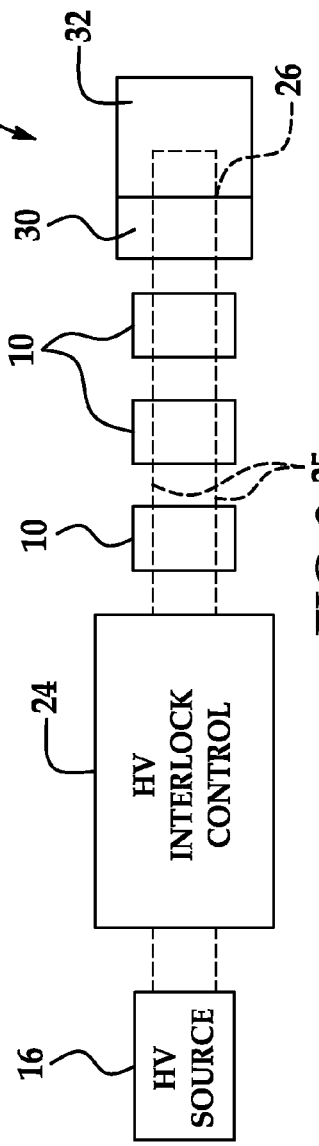
FIG. 2 is a schematic diagram of an illustrative embodiment of the centralized HV interlock system, shown in a connected or activated configuration.

An HV interlock control unit 24 is electrically connected in series to the HV electrical source 16 and to the HV components 10 such as via suitable electrical wiring 25, for example. Alternatively, the HV interlock control unit 24 may not be physically separate from the HV electrical source 16 but may be inside a common unit or module based on architecture and/or partitioning. As shown in FIG. 2, the HV interlock control unit 24 may be electrically interposed between the HV electrical source 16 and the HV components 10. The electrical wiring 25 may be disposed in direct electrical contact with each HV component 10 without the use of an interlock switch (not shown) as an intermediary structure. In some applications, multiple complete circuits (such as one circuit at the front and another circuit at the rear of the vehicle) may communicate via CAN regards interlock status; the system 1 need not necessarily be one complete vehicle circuit.

As further shown in FIGS. 2 and 3, the HV interlock control unit 24, the HV electrical source 16 and each of the HV components 10 of the system 1 is further electrically connected in series to a first structural component 30 and a second structural component 32 which detachably engages the first structural component 30. An HV electrical interlock 26 is defined between the first structural component 30 and the second structural component 32 and is disposed in electrical communication with the high voltage components 10. In typical implementation of the system 1, the HV electrical interlock 26 is the only electrical interlock in the system 1.

In implementation of the system 1, the HV electrical source 16 provides high-voltage electrical power to the HV components 10 via the electrical wiring 25. As long as the second structural component 32 engages the first structural component 30 and the HV electrical interlock 26 remains intact, as shown in FIG. 2, electrical power from the HV electrical source 16 to each of the HV components 10 is sustained. Simultaneously, the HV interlock control unit 24 continually monitors electrical conductivity in the electrical wiring 25.

Upon disengagement of the second structural vehicle component 32 from the first structural vehicle component 30, as shown in FIG. 3, the HV electrical interlock 26 is broken and the circuit in the electrical wiring 25 is opened. The HV interlock control unit 24 responds by electrically isolating the HV electrical source 16 from the HV devices 10 and discharging the electrical current in the system 1. This enables service personnel to safely access any of the HV devices 10 for repair, replacement and/or maintenance purposes.

The first structural component 30 and the second structural component 32 may be any components in the vehicle 2 which are capable of detachably engaging each other and may be located in any area or compartment of the vehicle 2. For example, as shown in FIG. 4, in some applications, the first structural component 30 may be a trunk latch 30a which is provided on a trunk lid 5a of the vehicle 2. The second structural component 32 may be a trunk latch receptacle 32a which is provided on the vehicle 2. When the trunk lid 5a is closed, the trunk latch 30a engages the trunk latch receptacle 32a and the HV electrical interlock 26 is intact, as shown in FIG. 2, such that electrical power from the HV electrical source 16 to each of the HV components 10 is sustained. When the trunk lid 5a is opened, the trunk latch 30a disengages the trunk latch receptacle 32a and breaks the HV electrical interlock 26, as shown in FIG. 3, such that the HV interlock control unit 24 terminates flow of electrical power to the HV components 10.

As further illustrated in FIG. 4, in other applications of the system 1, the first structural component 30 may be a hood latch 30b which is provided on a hood 4a of the vehicle 2 and the second structural component 32 may be a hood latch receptacle 32b which is provided on the vehicle 2. Closing of the hood 4a causes engagement of the hood latch 30b with the hood latch receptacle 32b and flow of electrical energy from the HV electrical source 16 to the HV components 10, whereas opening of the hood 4a causes disengagement of the hood latch 30b from the hood latch receptacle 32b in which case the HV interlock control unit 24 terminates further flow of electrical power to the HV components 10. In still other applications of the system 1, the first and second electrical components 30c, 32c may be parts of a seat hinge between a front seat 6 and a backrest 6a in the vehicle 2. Other suitable locations for placement of the HV electrical interlock 26 include between the vehicle and one or more doors (not shown) at the vehicle interior 3 (FIG. 1) of the vehicle 2; between the access cover 20 (FIG. 1) and the vehicle 2; or at hood bump stops (not shown), engine compartment beauty/styling covers (not shown), handles (not shown) or floor cover access panels (not shown). In applications in which the vehicle 2 is a plug-in hybrid electric vehicle, the HV electrical interlock 26 can be placed at the charge coupler access door (not shown) such that the HV electrical source 16 is isolated during charging of the vehicle. The system 1 can provide a vehicle interlock control override function for service/maintenance operations or during engineering validation.

It will be appreciated by those skilled in the art that the simplicity in design of the system 1 reduces the cost of the system; improves reliability of the system due to a reduction in the number of components and small wires in harsh environments; and high levels of coordination between interlocks and monitoring systems in a standard system.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A system of a high voltage component and a centralized high voltage interlock comprising:
   an electrical source;
   an interlock control unit electrically connected to said electrical source;
   at least one high voltage component disposed in direct electrical contact with said interlock control unit; and
   a high voltage electrical interlock disposed in electrical contact with said at least one high voltage component.

2. The system of claim 1 wherein said at least one high voltage component comprises a plurality of high voltage components.

3. The system of claim 1 wherein said electrical source comprises a high voltage traction battery, a high voltage capacitor, a high voltage inductor or other electrical energy storage device.

4. The system of claim 1 wherein said at least one high voltage component does not include a drive motor.

5. The system of claim 1 wherein said at least one high voltage component comprises at least one of a high voltage DC/DC converter, a high voltage vehicle air conditioning unit, a high voltage PTC heater and other high voltage climate control devices.

6. The system of claim 1 wherein said at least one high voltage component comprises a high voltage inverter system controller module comprising at least one inverter.

7. The system of claim 1 wherein said at least one high voltage component comprises a high voltage motor and/or generator, but excludes a drive motor.

8. The system of claim 1 further comprising a first structural component and a second structural component detachably engaging said first structural component, and wherein said high voltage electrical interlock is defined between said first structural component and said second structural component.

9. A high voltage component in combination with a centralized high voltage interlock system for a vehicle, comprising:
   an electrical source;
   an interlock control unit electrically connected to said electrical source;

said high voltage component disposed in direct electrical contact with said interlock control unit; and a first structural component and a second structural component detachably engaging said first structural component, said high voltage electrical interlock defined between said first structural component and said second structural component.

10. The system of claim 9 wherein said first structural component and said second structural component comprises a latch receptacle and a latch, respectively.

11. The system of claim 10 wherein said latch receptacle and said latch comprises a trunk latch receptacle and a trunk latch, respectively.

12. The system of claim 10 wherein said latch receptacle and said latch comprises a hood latch receptacle and a hood latch, respectively.

13. The system of claim 9 wherein said first structural component and said second structural component comprises a vehicle and an access cover provided on said vehicle, respectively.

14. The system of claim 9 wherein said electrical source comprises a high voltage battery, a high voltage capacitor, a high voltage inductor or other electrical energy storage device and said at least one high voltage component comprises at least one of a DC/DC converter, a high voltage vehicle air conditioning unit, an inverter system control module and high voltage single or multiple application motor and/or generator.

15. A plurality of high voltage components equipped with a centralized high voltage interlock system for a vehicle, comprising:

an electrical source;

an interlock control unit electrically connected to said electrical source;

a plurality of high voltage components disposed in direct electrical contact with said interlock control unit;

a first structural component;

a second structural component detachably engaging said first structural component;

a single high voltage electrical interlock disposed in electrical contact with said plurality of high voltage components, said single high voltage electrical interlock defined between said first structural component and said second structural component; and wherein said high voltage electrical interlock is the only electrical interlock disposed in electrical communication with said plurality of high voltage components.

16. The system of claim 15 wherein said first structural component and said second structural component comprises a latch receptacle and a latch, respectively.

17. The system of claim 16 wherein said latch receptacle and said latch comprises a trunk latch receptacle and a trunk latch, respectively.

18. The system of claim 16 wherein said latch receptacle and said latch comprises a hood latch receptacle and a hood latch, respectively.

19. The system of claim 15 wherein said at least one high voltage component comprises at least one of a DC/AC converter, a vehicle air conditioning unit, an idle speed control and a motor generator.

* * * * *